United States Patent
Landl

(10) Patent No.: US 6,260,441 B1
(45) Date of Patent: Jul. 17, 2001

(54) SKI EDGE SHARPENER

(76) Inventor: Karl Landl, 6 W. Ridge Ave., Prospect Heights, IL (US) 60070

( * ) Notice: Subject to any disclaimer, the term of this patent is extended or adjusted under 35 U.S.C. 154(b) by 0 days.

(21) Appl. No.: 09/454,369

(22) Filed: Dec. 3, 1999

(51) Int. Cl.[7] .............................. B23D 67/12; B21K 17/00
(52) U.S. Cl. ................................................ 76/83; 451/558
(58) Field of Search ........................ 76/83, 88; 451/555, 451/558

(56) References Cited

U.S. PATENT DOCUMENTS

| 512,382 | * | 1/1894 | Knowles et al. ........................ 76/83 |
| 555,974 | * | 3/1896 | Roberts et al. ......................... 76/83 |
| 1,388,659 | * | 8/1921 | Mitchell ................................. 76/83 |
| 1,594,246 | * | 7/1926 | Dechert ................................. 76/83 |
| 1,892,667 | * | 1/1933 | Harnden ............................. 451/558 |
| 3,991,429 | | 11/1976 | Honauer . |
| 4,030,382 | | 6/1977 | Nilsson et al. . |
| 4,060,013 | | 11/1977 | Thompson . |
| 4,089,076 | | 5/1978 | Sparling . |
| 4,121,484 | | 10/1978 | Gorlach et al. . |
| 4,280,378 | | 7/1981 | Levine . |
| 4,347,766 | | 9/1982 | Heinlein . |
| 4,442,636 | | 4/1984 | Obland . |
| 4,509,297 | | 4/1985 | Lindgren . |
| 4,569,158 | | 2/1986 | Curmi . |
| 4,601,220 | | 7/1986 | Yurick, Jr. . |
| 4,721,020 | | 1/1988 | Stumpf . |
| 4,850,252 | | 7/1989 | Sewell . |
| 4,882,953 | | 11/1989 | Kalka . |
| 5,485,768 | | 1/1996 | Vermillion . |
| 5,499,555 | | 3/1996 | Vermillion . |
| 5,647,250 | | 7/1997 | Holmer . |
| 5,701,787 | | 12/1997 | Brill . |

OTHER PUBLICATIONS

*Race Place*, Oct. 1999, Issue 5, pp. 18–21.
*Race Werks 2000 Race Catalog*, pp. 23–25.

* cited by examiner

Primary Examiner—Hwei-Siu Payer
(74) Attorney, Agent, or Firm—Thomas R. Vigil

(57) ABSTRACT

The ski edge sharpener comprises a generally rectangular-in-cross-section elongate block or body having four elongate side surfaces, a file blade mounting plate releasably fixed to one of the elongate side surfaces and a file blade mounted on or to the file blade mounting plate in position to engage a side edge of a ski placed on an adjacent elongate side surface of the block or body for sharpening the ski side edge at one of four angles.

14 Claims, 3 Drawing Sheets

SKI EDGE SHARPENER

BACKGROUND OF THE INVENTION

1. Field of the Invention

The present invention relates to a ski edge sharpener which provides four sharpening angles, which allows both sides of a file blade to be used for filing, which allows longitudinal sections on each side of the file blade to be used for filing, which can provide a small "bow" to the file blade for filing curved ski edges, which permits exchange of the file blade and which provides a slot for receiving filings.

2. Description of the Prior Art

Heretofore various examples of analogous and non-analogous ski edge sharpener devices have been proposed. Examples of such previously proposed analogous and non-analogous ski edge sharpener devices are disclosed in the following U.S. Patents:

| U.S. Pat. No. | Patentee |
| --- | --- |
| 3,991,429 | Honauer |
| 4,030,382 | Nilsson et al. |
| 4,060,013 | Thompson |
| 4,089,076 | Sparling |
| 4,121,484 | Gorlach et al. |
| 4,280,378 | Levine |
| 4,347,766 | Heinlein |
| 4,442,636 | Obland |
| 4,509,297 | Lindgren |
| 4,569,158 | Curmi |
| 4,601,220 | Yurick, Jr. |
| 4,721,020 | Stumpf |
| 4,850,252 | Sewell |
| 4,882,953 | Kalka |
| 5,485,768 | Vermillion |
| 5,499,555 | Vermillion |
| 5,647,250 | Holmer |
| 5,701,787 | Brill |

See also the MULTIPLE-ANGLE DIAMOND EDGE TOOL sold by Sun Valley Ski Tools of Caldwell Idaho.

The Nelson et al. U.S. Pat. No. 4,030,382 discloses a SHARPENING DEVICE FOR STEEL SKI EDGE STRIPS wherein a file blade can be bent by tightening a clamping screw to put an arc in the file blade. Also a wedge can be employed to sharpen the ski edge at an angle less than 90°.

The MULTIPLE-ANGLE DIAMOND EDGE TOOL by Sun Valley Ski Tools is elongate and generally square in cross section with four corner extensions each having a file blade and providing with an adjacent side of the tool, four different file angles.

SUMMARY OF THE INVENTION

According to the present invention, there is provided a ski edge sharpener comprising a generally rectangular-in-cross-section elongate block or body having our elongate side surfaces, a file blade mounting plate releasably fixed to one of the elongate side surfaces and a tile blade mounted on or to the file blade mounting plate in position to engage a side edge of a ski placed on an adjacent elongate side surface of the block or body for sharpening the ski side edge at one of four angles.

DESCRIPTION OF THE PREFERRED EMBODIMENT(S)

Figure 1:
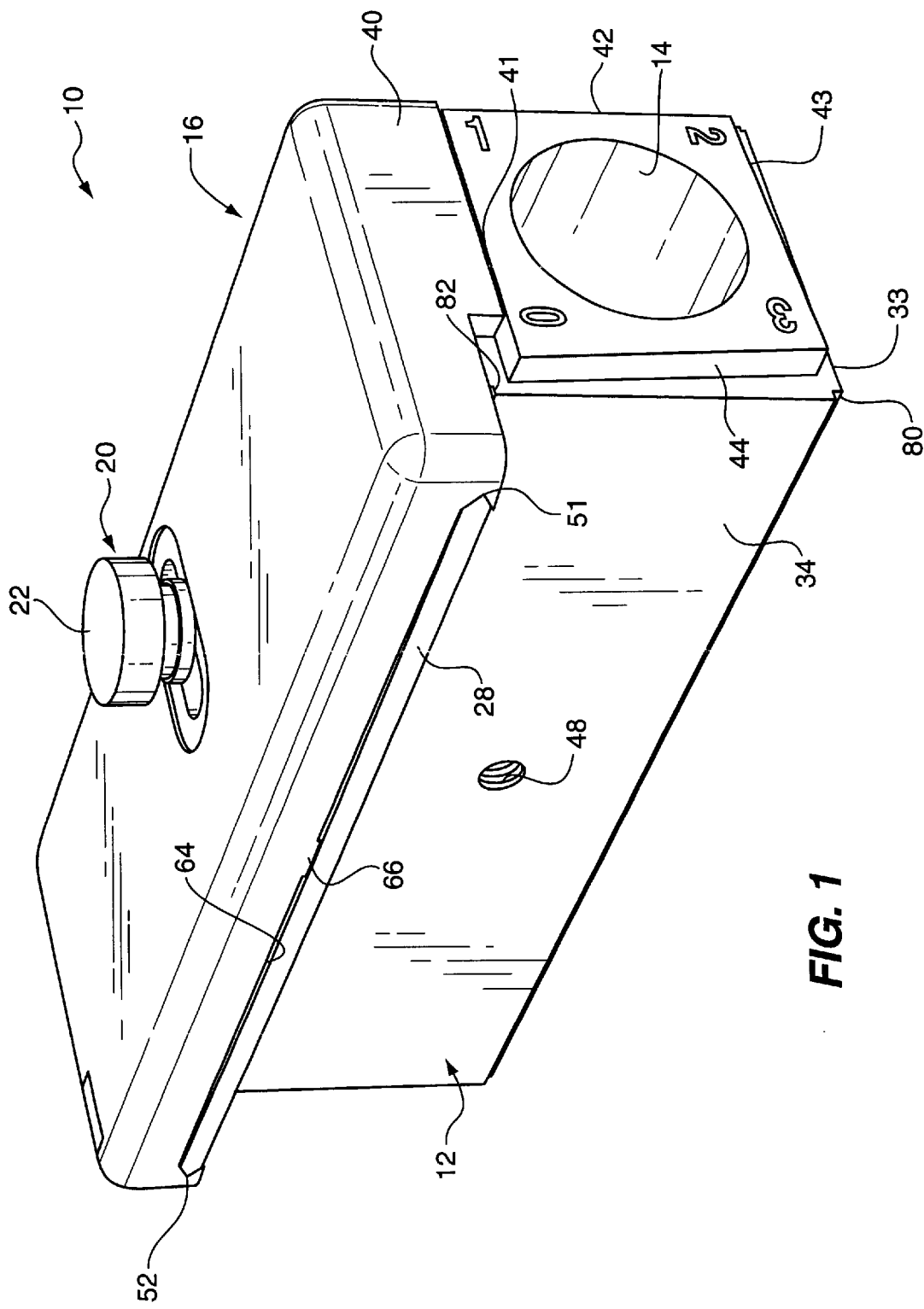
FIG. 1 is a perspective view of a ski edge sharpener constructed according to the teachings of the present invention.

Referring now to the drawings in greater detail, a ski edge sharpener constructed according to the teachings of the present invention is shown at 10 in FIG. 1.

The sharpener 10 includes a generally elongate rectangular-in-cross-section body 12 which has a through-bore 14 therethrough for reducing the weight of the body 12. The body 12 is preferably made of aluminum.

Releasably attached to the body 12 is a file blade mounting plate 16 which also is preferably made of aluminum.

As shown in FIG. 1, the file blade holding plate 16 has a transverse elongate countersunk slot 18 therethrough for receiving a thumb screw 20 which can have a knurled head 22 and a threaded shaft 24 for easily and quickly mounting the plate 16 to the block 12.

The provision of the elongate transverse slot 18 enables an underside 26 of the file blade mounting plate 16, mounting an elongate file blade 28, to be moved inwardly and outwardly from one of four elongate side surfaces 31–34 of the body or block 12 to adjust the position of a longitudinal section of the file blade 28 against which a side edge 36 of a ski 38 is positioned for sharpening of the ski edge 36 by relative movement between the sharpener 10 and the ski 38.

In this way, a longitudinal section of the file blade 28 that is positioned adjacent the side surface 31 of the block or body 12 is in position to sharpen the ski side edge 36 and this longitudinal section of the file blade 28 can be changed by moving the file blade mounting plate 16 inwardly or outwardly relative to a long axis of the slot 18 to position a different longitudinal section of the file blade 28 adjacent the ski side edge 36 thereby to enable a user to use all the longitudinal sections of the file blade 28 and have full use of the file blade 28. Also, as explained below, the file blade 28 can be turned over in the file blade mounting plate 16 to allow for use of both sides of the file blade 28. This extends the time of use of the file blade 28 before the file blade 28 needs to be replaced.

The file blade mounting plate 16 is shown releasably fixed to a side surface 31 (FIG. 2) of the body 12 of the sharpener 10. In all, there are four side surfaces, namely the side surface 31, second side surface 32, third side surface 33 and the fourth side surface 34.

Figure 2:
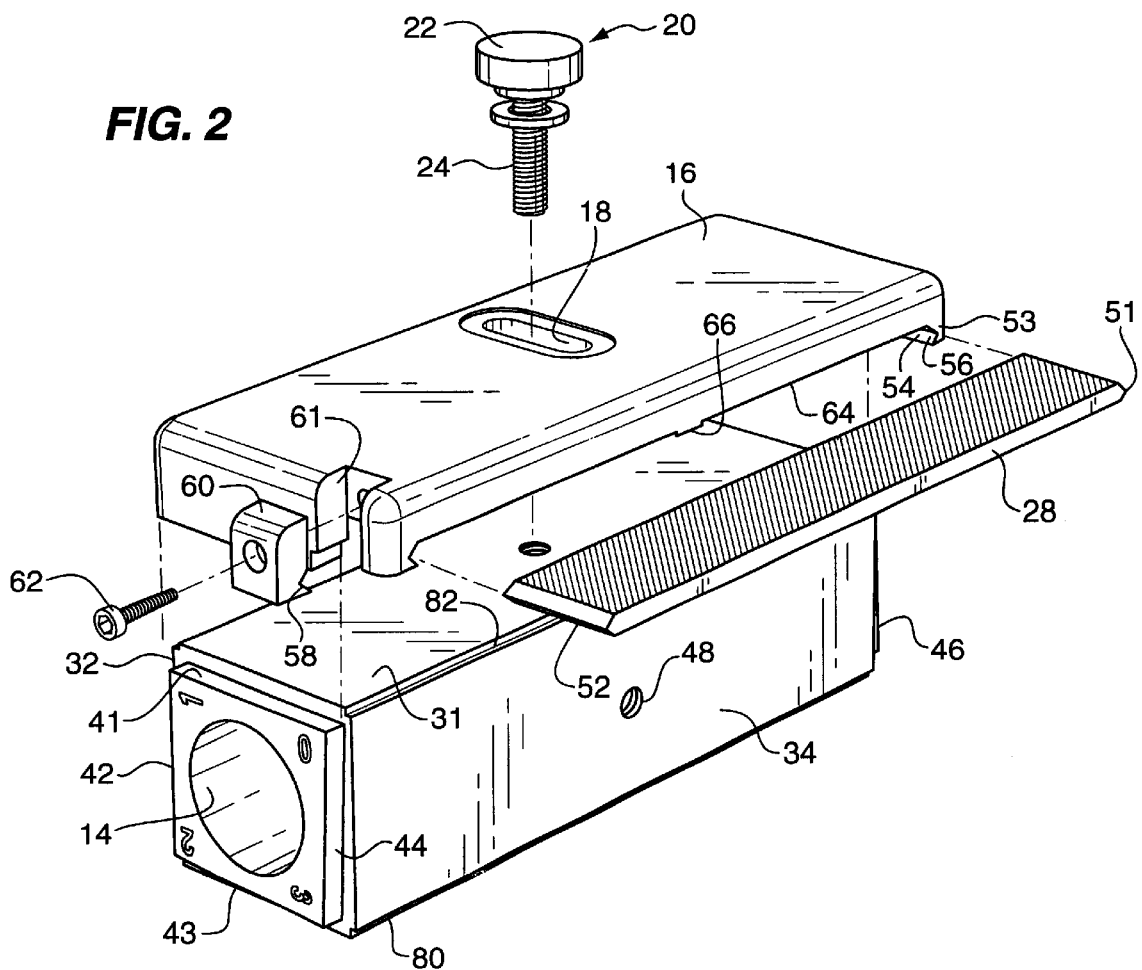
FIG. 2 is a perspective exploded view of the parts of the ski edge sharpener shown in FIG. 1.
Figure 3:
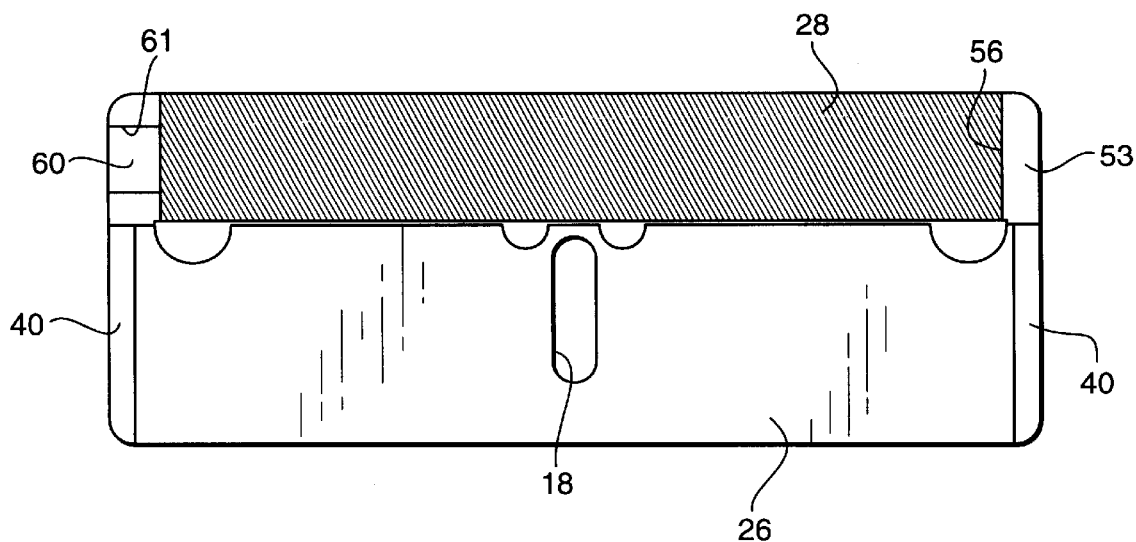
FIG. 3 is an underside plan view of a file blade holding plate of the ski edge sharpener of present invention which is secured to a body of the ski edge sharpener.
Figure 4:
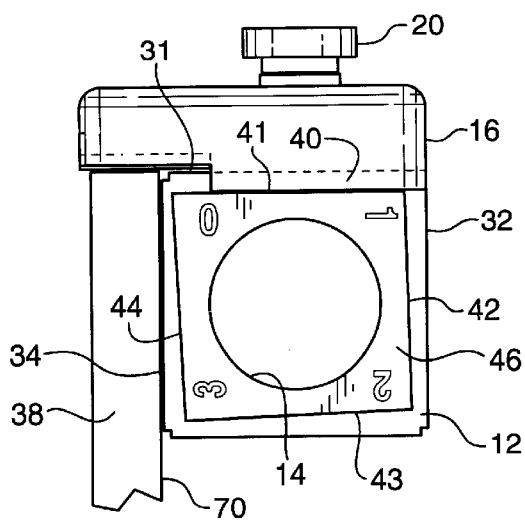
FIG. 4 is an end view of the ski edge sharpener shown in FIG. 1 showing an end flange of the file blade holding plate positioned on an angle determining shoulder surface of the body which surface is set at 0° to provide a 90° filing of the edge of a ski blade with the ski edge.

Referring now to FIGS. 2 and 3, it will be understood that the file blade mounting plate 16 has the underside 26 which, when mounted to the block or body 12, is located slightly above one of the side surfaces 31, 32, 33 or 34. As shown in FIGS. 2 and 3, the file blade mounting plate 16 has a depending flange 40 on each side thereof which is adapted to be received on and bear against one of four angle determining surfaces or shoulders 41, 42, 43 and 44 located on end bosses 45, 46 on each end of the body or block 12, respectively, adjacent one of the side surfaces 31–34.

As shown in FIG. 2, each side surface 31–34 has a threaded hole 48 for receiving the thumb screw 20.

For holding the file blade 28, end edges 51, 52 of the file blade 28 are formed with a convex V shape and at least one wall 53 of the file blade mounting plate 16 has a V-shaped groove 54 on an inner side 56 of the wall 53 (FIG.'s 2 and 3) for receiving a mating V-shaped end edge 51, 52 of the file blade 28. The other V-shaped end edge 52, 51 of the file blade 28 is received in a V-shaped groove 58 in a removable locking plug 60 which is received in a slot 61 in one of the flanges 40 and held therein by a recessed hexagon head or Phillips head screw 62 that is screwed into the file blade mounting plate 16 as shown.

As shown in FIG. 2, the file blade mounting plate 16 is cut away on the underside 26 in the area between the flanges 40 where the file blade 28 is received. To provide an undercut surface 64. In the middle of the undercut surface there is provided a raised boss 66 that extends downwardly from the undercut surface 64 as best shown in FIG. 2.

The raised boss 66 can be between 0.001 inch and 0.010, and is preferably between 0.002 and 0.006 inch in height from the undercut surface 64 of the file blade mounting plate 16. This boss 66 imparts a slight "bow" to the file blade 28 so that it can be used for sharpening not only a straight side edge 36 of the ski 38 but also a curved side edge of the ski 38.

Figure 5:
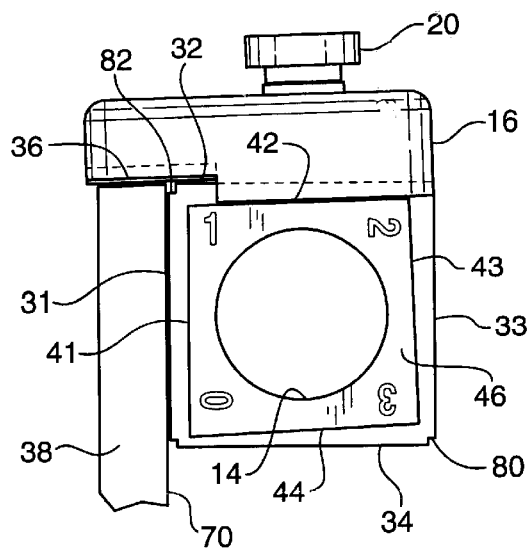
FIG. 5 is an end view of the ski edge sharpener shown in FIG. 1 showing an end flange of the file blade holding plate positioned on an angle determining shoulder surface of the body which surface is set at 1° to provide an 89° filing of the edge of a ski blade with the ski edge.
Figure 6:
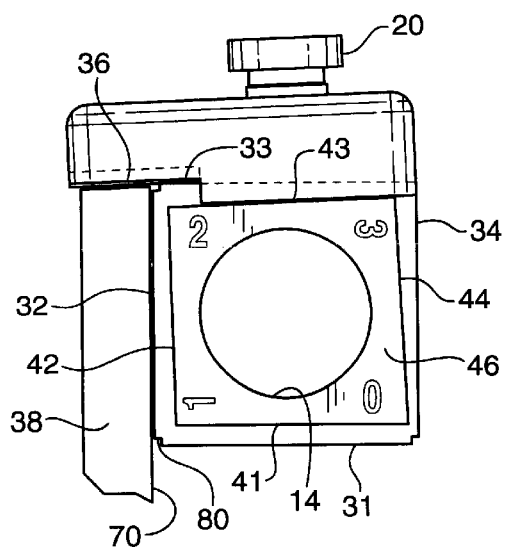
FIG. 6 is an end view of the ski edge sharpener shown in FIG. 1 showing an end flange of the file blade holding plate positioned on an angle determining shoulder surface of the body which surface is set at 2° to provide an 88° filing of the edge of a ski blade with the ski edge.
Figure 7:
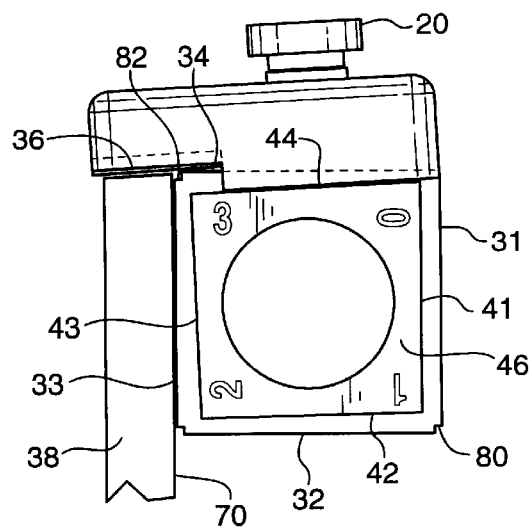
FIG. 7 is an end view of the ski edge sharpener shown in FIG. 1 showing an end flange of the file blade holding plate positioned on an angle determining shoulder surface of the body which surface is set at 3° to provide an 87° filing of the edge of a ski blade with the ski edge.

As shown in FIGS. 4–7, the flanges 40 are positioned to rest on a pair of angle determining surfaces 41,42,43 or 44 which provide a sharpening edge of 90°, 89°, 88° or 87° relative to a bottom 70 of the ski 38. Then, one can remove the file blade mounting plate 16, with the file blade 28 mounted therein and position the flanges 40 of the plate 16 on the angle determining surfaces 42 to provide a 1° cant as shown in FIG. 5 for an 89° corner edge of the side of the ski 38 with the bottom 70 of the ski 38. FIG. 6 then shows the position of the flanges 40 for a 2° cant to provide a sharpening angle of 88° and FIG. 7 shows the position of the flanges 40 for a 3° cant to provide a sharpening angle of 87°.

It will be understood that any desired angle can be provided to the angle alignment surfaces, such as, for example, 0.5°, 0.62°, 0.75° or 1.5°, or whatever angle is deemed most desirable to a skier. In any event, with the sharpener 10 of the present invention, one can provide four canting angles to provide four sharpening edge angles to a ski.

The file blade 28 is preferably a flat, smooth, single cut blade which can have a hardness between 55 and 75 on the Rockwell C-Scale. Typical hardnesses are 64 R.C., 67 R.C. and 72 R.C.

It will be noted that longitudinal corners of the body or block 12 are cut away or have a rabbet 80 thereby to provide a small longitudinally extending slot 82 for filings, as best shown in FIGS. 4–7. In this respect, as a ski edge 36 is being filed, there will be small filings from the material filed off the ski edge 36 and to prevent those small filings from scratching the bottom 70 or other surface of the ski 38, the rabbet 80 provides the slot 82 for catching and holding these filings until the sharpening is completed. The rabbet 80 also allows the filings to slide in the slot 82 as the ski edge 36 is being sharpened, or the filings can be blown or brushed out of the slot 82 by the user.

From the foregoing description, it will be apparent that the ski edge sharpener 10 of the present invention has a number of advantages, some of which have been described above and others of which are inherent in the invention. Also, it will be understood that modifications can be made to the ski edge sharpener 10 of the present invention without departing from the teachings of the invention. Accordingly, the scope of the invention is only to be limited as necessitated by the accompanying claims.

I claim:

1. A ski edge sharpener comprising a generally rectangular-in-cross-section elongate block or body having four elongate side surfaces, a file blade mounting plate releasably fixed to one of the elongate side surfaces, a file blade mounted on or to said plate in position to engage a side edge of a ski placed on an adjacent elongate side surface of said block or body and said body or block having outwardly extending end bosses each having an angle determining surface or shoulder with an adjacent elongate side surface of said body or block, each pair of angle determining surfaces on said end boss on each side of said body or block defining one of four angles or cants which can be imparted to the ski edge to be sharpened.

2. The ski edge sharpener of claim 1 wherein said file blade mounting plate is releasably fixed adjacent one elongate side surface of the body or block by a releasable fastening mechanism.

3. The ski edge sharpener of claim 1 wherein said elongate file blade mounting plate has opposite ends each having a depending flange which is adapted to be mounted against one of said angle determining surfaces and the underside of said file blade mounting plate between said flanges is recessed so that the file blade mounting plate is located above one elongate side surface of said body and is at a predetermined angle to an adjacent elongate side surface, the angle being determined by said angle determining surfaces.

4. The ski edge sharpener of claim 1 wherein said body or block is made of aluminum.

5. The ski edge sharpener of claim 1 wherein said file blade mounting plate is made of aluminum.

6. The ski edge sharpener of claim 1 wherein said file blade is a flat, smooth, single cut blade having a Rockwell C hardness between 55 and 75 .

7. A ski edge sharpener comprising a generally rectangular-in-cross-section elongate block or body having four elongate side surfaces, a file blade mounting plate releasably fixed to one of the elongate side surfaces, a file blade mounted on or to said plate in position to engage a side edge of a ski placed on an adjacent elongate side surface of said block or body and said file blade mounting plate being releasably fixed adjacent one elongate side surface of the body or block by a releasable fastening mechanism comprising a thumb screw which is received in a threaded bore in said elongate side surface in each one of said elongate side surfaces of said body or block.

8. The ski edge sharpener of claim 7 wherein said file blade mounting plate has a transverse slot therein for receiving said thumb screw whereby the lateral position of said file blade mounting plate can be adjusted thereby to adjust the position of a longitudinal section of the file blade relative to a ski edge being sharpened, so that one can utilize a substantial number of the longitudinal sections of the file blade for engaging and sharpening a corner edge of the ski between the bottom surface and the side edge of the ski.

9. A ski edge sharpener comprising a generally rectangular-in-cross-section elongate block or body having four elongate side surfaces, a file blade mounting plate releasably fixed to one of the elongate side surfaces, a file blade mounted on or to said plate in position to engage a side edge of a ski placed on an adjacent elongate side surface of said block or body and said body having a longitudinal bore therethrough to reduce the weight of said body or block.

10. A ski edge sharpener comprising a generally rectangular-in-cross-section elongate block or body having four elongate side surfaces, a file blade mounting plate releasably fixed to one of the elongate side surfaces, a file blade mounted on or to said plate in position to engage a side edge of a ski placed on an adjacent elongate side surface of said block or body and said file blade mounting plate having, on an underside thereof, means for releasably holding said file blade to the underside of said file blade mounting plate along one elongate side of said file blade mounting plate.

11. A ski edge sharpener comprising a generally rectangular-in-cross-section elongate block or body having four elongate side surfaces, a file blade mounting plate releasably fixed to one of the elongate side surfaces, a file blade mounted on or to said plate in position to engage a side edge of a ski placed on an adjacent elongate side surface of said block or body and releasable holding means including mating structure between said file blade mounting plate and said file blade for releasably fixing ends of said file blade against movement and a file blade deflecting boss extending between 0.001 inches and 0.010 inches from an underside of said file blade mounting plate for imparting a "bow" to said file blade to provide a small bend or flex in the file blade.

12. The ski edge sharpener of claim 11 wherein the height of said deflecting boss is between 0.002 and 0.006 inches.

13. A ski edge sharpener comprising a generally rectangular-in-cross-section elongate block or body having four elongate side surfaces, a file blade mounting plate releasably fixed to one of the elongate side surfaces, a file blade mounted on or to said plate in position to engage a side edge of a ski placed on an adjacent elongate side surface of said block or body and said generally rectangular-in-cross-section elongate body being generally square in cross-section and each elongate corner edge of said elongate body having a rabbet or cutaway shoulder thereby to provide a small elongate slot adjacent said file blade for receiving small filings of material filed off of the side edge of a ski.

14. A ski edge sharpener comprising a generally rectangular-in-cross-section elongate block or body having four elongate side surfaces, a file blade mounting plate releasably fixed to one of the elongate side surfaces, a file blade mounted on or to said plate in position to engage a side edge of a ski placed on an adjacent elongate side surface of said block or body and mating means on said body or block and on said file blade mounting plate for setting a plane of said file blade at a predetermined angle to a plane of an adjacent, elongate side surface of said body or block for each mounting of said file blade mounting plate to an adjacent one of said four elongate side surfaces of said block or body.

* * * * *